Nov. 21, 1933.  W. H. KNISKERN  1,936,167
APPARATUS FOR SYNTHESIZING AMMONIA
Filed June 27, 1930  2 Sheets-Sheet 2
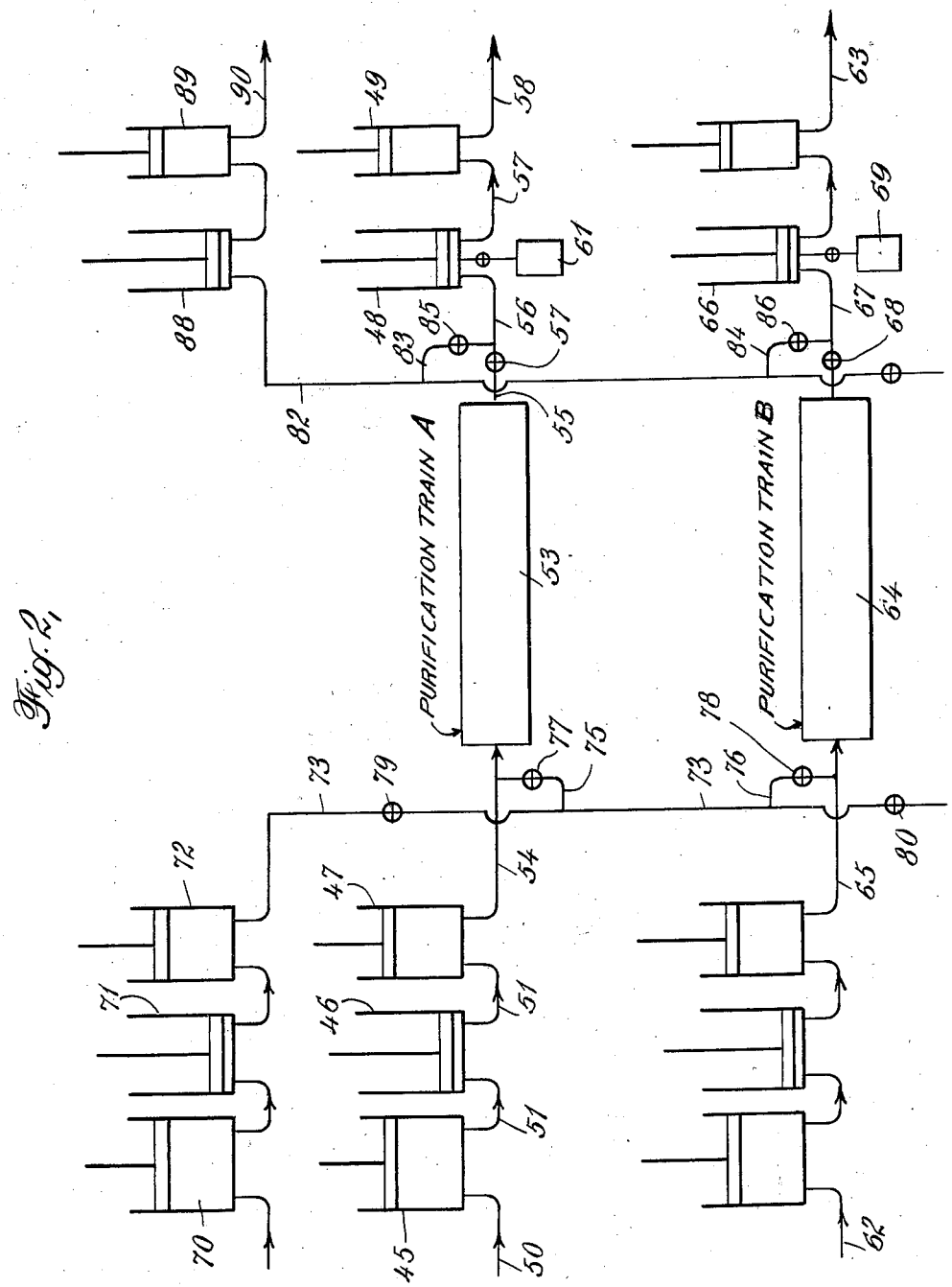
INVENTOR
Walter H. Kniskern
BY
ATTORNEY Patented Nov. 21, 1933

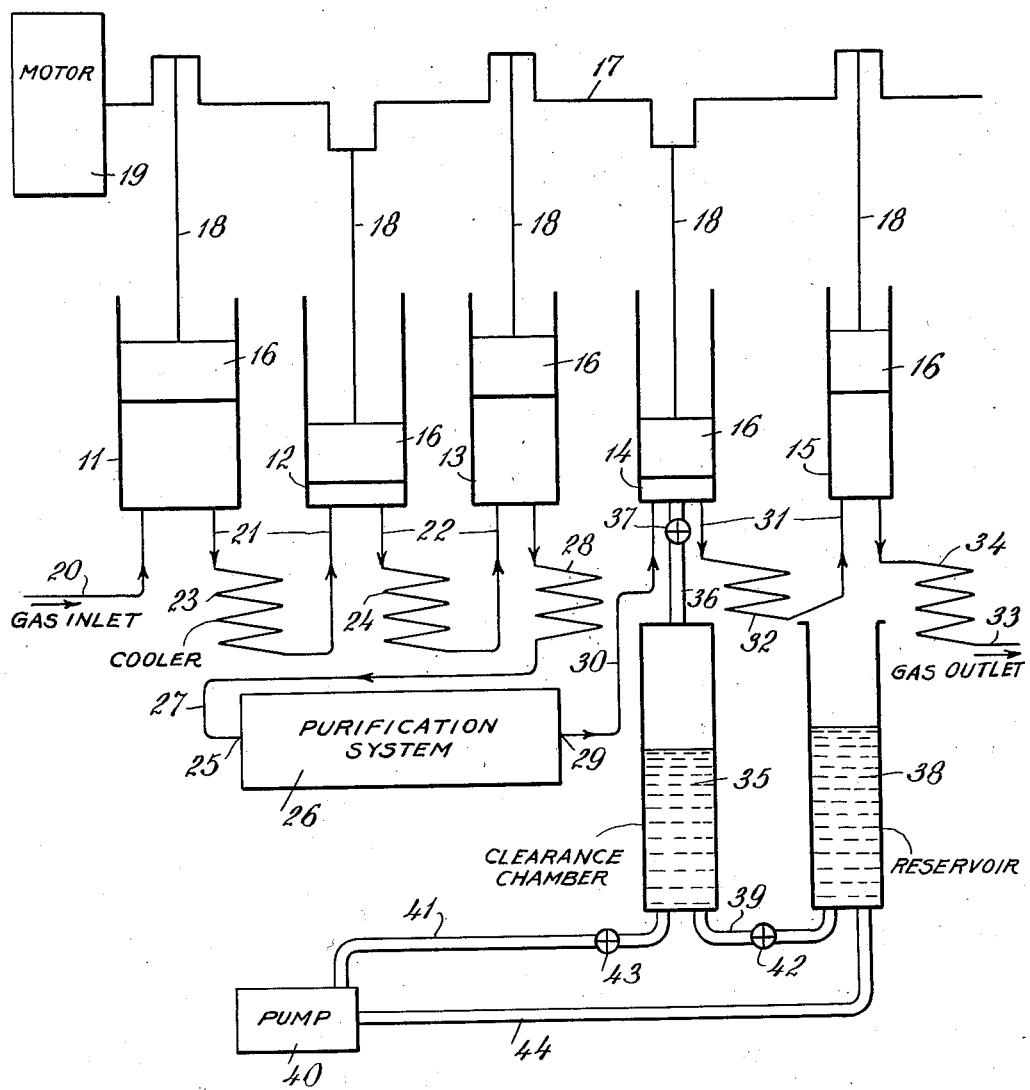

1,936,167

UNITED STATES PATENT OFFICE 1,936,167

APPARATUS FOR SYNTHESIZING AMMONIA

Walter H. Kniskern, Petersburg, Va., assignor to Atmospheric Nitrogen Corporation, New York, N. Y., a corporation of New York Application June 27, 1930. Serial No. 464,306

6 Claims. (Cl. 183—34)

This invention relates to an apparatus for compressing a gas. The invention is directed more particularly to an apparatus for the manufacture of synthetic ammonia involving the compression of a gas mixture containing primarily nitrogen, hydrogen and gaseous impurities, in a plurality of stages, and purifying the gas under pressure intermediate two compression stages.

Processes are known in which a gas containing impurities is subjected to pressure and then purified. For example, in the production of synthetic ammonia by catalysis of a mixture of nitrogen and hydrogen, a crude gas containing these constituents in admixture with gaseous impurities is compressed, and the gaseous impurities removed while the gas mixture is maintained under pressure.

For satisfactory and efficient operation of the purification system, it is highly desirable that the pressure of the gas within the purification system remain substantially constant. Variations in purification pressures are highly undesirable. At pressures below the normal purification pressure, for equal efficiency, larger and more expensive apparatus and the pumping of increased quantities of purifying water and solution are required. At pressures above normal purification pressure, the purifying liquids must be delivered against higher pressures, and the pumps and apparatus must therefore be made heavier than required for the normal purification pressure, and the motors or engines driving the pumps must be of increased size. Accordingly, in the construction of a plant in which operating pressures within the purification system fluctuate to any considerable degree, the apparatus must be both larger and heavier, and hence relatively expensive as compared with the construction of a plant in which the normal operating pressures within the purification system can be maintained under all operating conditions encountered.

In processes, such as in the synthetic production of ammonia, it is of utmost importance that the crude gases be thoroughly and completely purified. This necessitates a rigid control of the purification system in order to maintain the proper operation of the synthesis system. It is exceedingly difficult to attain the requisite degree of control of purification under constantly changing operating conditions. In order to maintain the desired constant pressure at successive points in the purification system, or within the purification system when the latter is considered as a whole or as a unit, it is necessary that the relation between the amount of gas passed into the purification system to the amount of gas withdrawn therefrom be altered in accordance with changing operating conditions such as the composition of the raw gas mixture, variations affecting the proportion of gas removed from the mixture during purification as well as other factors which vary from time to time. In order to compensate for fluctuations caused by changing operating conditions, it is necessary to be able to control the amount of gas pumped into the purification system and the amount of gas withdrawn therefrom.

It has been proposed heretofore to compress an impure nitrogen-hydrogen gas to an intermediate pressure lower than the pressure at which synthesis is to be conducted, to remove gaseous impurities at that intermediate pressure, then to compress the gas to the final synthesis pressure and further remove other gaseous impurities before passing the gas into contact with the catalyst for the production of ammonia.

It is an object of this invention to provide an apparatus particularly adaptable for use in the process of making ammonia by synthesis of a crude gas containing hydrogen and nitrogen, which includes the compression of the crude gas to an intermediate pressure less than the pressure desired for synthesis, purifying the gas under conditions involving a drop in pressure, due to frictional losses during the passage of the gas through the purification train, maintaining substantially constant pressures at successive given points within the purification system or a predetermined pressure range within the purification system, by altering the volumes of gas being withdrawn from the purification system, and then compressing the gas to a pressure suitable for synthesis. The invention further comprehends the provision of apparatus for effecting the improved method which includes preferably the employment of a single compressor of any desired number of compression stages with the purification system interposed between any two successive compression stages, and devices associated either with the compression stage ahead of or beyond the purification system for altering and controlling the ratio of the volume of gas entering and leaving the purification system.

The accompanying drawings diagrammatically illustrate in Fig. 1 a preferred form of apparatus embodying the invention, and in Fig. 2, a further application of the invention.

Referring to Fig. 1, the numerals 11, 12, 13, 14 and 15 indicate the compression units or cylinders of a five-stage compressor. The cylinders are provided with pistons 16 reciprocated at rates each bearing a constant ratio to the others by the crankshaft 17 through the connecting rods 18. The crankshaft 17 is connected to and operated by a motor or other suitable source of power 19.

Gas is admitted to the low pressure cylinder 11 through the inlet pipe 20. The outlet sides of cylinders 11 and 12 are connected to the inlets of cylinders 12 and 13 respectively by the gas pipes 21 and 22 which include the cooling coils 23 and 24 of any suitable design. The outlet port of cylinder 13 is connected to the inlet 25 of the purification system, indicated generally at 26, by means of the gas conduit 27, which conduit also includes an appropriate cooling device 28. The outlet 29 of the purification system is connected to the intake valve of cylinder 14 through the conduit 30. Pipe 31, including the cooler 32, connects the outlet of cylinder 14 with the intake of cylinder 15. After final compression in cylinder 15, the gas passes through the outlet pipe 33 including the cooler 34 to apparatus not shown for ammonia synthesis or for further purification or other treatment. It will be understood that the compression cylinders are each provided at their intake and outlet ports with the customary one-way inlet and outlet valves, and that the coolers may include suitable means for withdrawing water condensed therein.

In the embodiment of the invention illustrated, the cylinder 14, connected to the outlet side of the purification system, is equipped with a clearance control mechanism for varying the quantity of gas withdrawn from the purification system to maintain a substantially constant predetermined pressure within the purification system. The clearance control mechanism consists of a closed clearance cylinder or chamber 35, the interior of which is connected to the compression chamber of cylinder 14 by the pipe 36 controlled by the valve 37. The clearance chamber 35 is adapted to receive and hold a relatively non-volatile liquid, such as mercury or oil or any other suitable liquid which is inert to the gases undergoing compression in the apparatus. The lower end of the chamber 35 is connected to the lower end of an open top reservoir 38 by a pipe 39, and to the outlet side of pump 40 by the pipe 41. Pipes 39 and 41 are each controlled by valves 42 and 43 respectively. The lower end of the reservoir 38 is in communication with the intake of pump 40 through the pipe 44.

The size of the cylinder 14 may be determined by the following considerations: Based on an average water temperature, gas composition, fraction of gas removed during purification, pressure drop through the purification system, and other factors, such as the temperature of the gas at various points in its passage through the apparatus, the proper size of cylinders 11, 12, and 13 is determined in known manner to take a gas at substantially atmospheric pressure into the apparatus through inlet 20 and compress it in three stages to the pressure at which it is desired to introduce the gas into the purification system through the inlet 25. Further, based on an average quantity of gas removed in purification and some predetermined pressure drop within the purification system, the proper size of cylinders 14 and 15 is determined to take the residual gas issuing from the outlet 29 of the purification system and compress it in the last two stages to the final synthesis pressure. The manner of determining the cylinder sizes to provide for a specific set of conditions is known to those skilled in this art.

However, the various factors mentioned above which have been used as a basis for the design of the apparatus, actually vary in practice throughout a given operating period. For instance, the variable water temperature affects the proportion of gas lost in purification. The change in the composition of the gas influences the proportion of gas removed during purification to such an extent as to cause a variation in volume reduction as high as 25% to 30% of the total volume reduction. The fluctuation in the amount of gas removed during purification has a direct bearing on the pressure within the purification system. These and other variable factors cause a wide fluctuation of the gas pressure at the point of introduction into the purification system and within the system itself with the result that instead of maintaining the desired predetermined pressure within the purification system, and the issuance of the gas from the purification system at the predetermined pressure, the pressure of the exit gas from the purification system may vary over a range of as much as 100 pounds per square inch.

For the reasons already pointed out, this fluctuation of gas pressure within the purification system is highly undesirable and detrimental to efficient operation, and the difficulties thus encountered are overcome by the practice of the present invention.

In constructing an apparatus embodying my invention, cylinders 11, 12, and 13 are built of the necessary capacity to handle the desired quantity of gas, and are proportioned with respect to one another in the known manner, so that gas from the inlet of the apparatus is conducted through cylinders 11, 12, and 13 to the inlet 25 of the purification system, and at the same time compressed in these cylinders to the predetermined pressures. Cylinder 14, on the other hand, is proportioned with respect to cylinders 11, 12, and 13, so that, when drawing gas through conduit 30 communicating with the outlet of the purification system, valve 37 being closed, it has sufficient capacity to handle all of the residual gas remaining after purification which may be delivered to the purification system under any conditions of operation with respect to temperatures, gas composition, etc. In other words, cylinder 14 is so proportioned that it will handle the maximum amount of gas which may at any time be delivered from purification system 26 under any operating conditions which may ordinarily be encountered.

The method of compressing and purifying a gas, for example in the process of making ammonia when the crude gas contains nitrogen and hydrogen and gaseous impurities, and the operation of the apparatus illustrated in the drawings is as follows:

The crude gas mixture is drawn into the apparatus and into the low pressure cylinder 11 through the inlet pipe 20. The gas entering cylinder 11 may be regarded as comprising three components; namely, a mixture of nitrogen and hydrogen which is the valuable component, gaseous impurities which are to be eliminated prior to synthesis, and aqueous vapor. In the crude gas, the percentage of gaseous impurities will vary as a result of irregularities in the manufacture of the gas, and in addition, may vary with changes in the method of manufacture. The aqueous vapor in the entering gas may in some instances vary over a range of approximately one volume in 120 to one volume in 30, depending upon the temperature of the gas. As the pressure is raised by the passage of the gas successively through the cylinders 11, 12, and 13, the aqueous vapor condenses in the coolers 23, 24, and 28, and is drawn off as water from the respective coolers. During the compression of the gas in the first three stages, water is condensed and removed from the gas stream to such an extent that the gas on entering the purification system 26 may be regarded as substantially free from water. After passage through cylinders 11, 12, and 13, the cooler 28 and the conduit 27, the gas is delivered to the inlet 25 of the purification system at the desired initial intermediate purification pressure.

In the present process, purification of the gas is effected while the gas is at the intermediate pressure created in the compression stages preceding the purification system. The purification system includes means known to those skilled in this art for the removal of undesirable constituents.

It will be apparent that the gas flowing through the apparatus and connecting piping comprising the purification system will undergo a loss of pressure because of friction, so that in operation there is a diminishing pressure gradient from the inlet to the outlet of the system. However, this drop in pressure is small as compared with the pressures maintained in the system. By the use of the terms "normal" or "constant" pressure within the system, it is not intended to infer that the gas pressure in the system is the same at all points, but rather to state that the pressure gradient or average pressure within the system remains substantially constant.

The absorption of impurities in the purifying liquids and the completeness of the purification are improved by pressure; furthermore, with increase in pressure the size of apparatus required is reduced; this is on account of the fact that the volumes of gas and liquids to be handled vary approximately inversely with the pressure. In the compression prior to purification, substantially all the aqueous vapor has been removed and in the purification system about one-third the volume of gas entering the system is removed in purification, however, the volume of aqueous vapor removed in compression prior to purification varies, and the fraction of gas removed in purification varies; and as a result of the variation of these two factors, the pressure within the purification system varies.

When the apparatus is operating at normal predetermined conditions, valve 37 is open placing clearance chamber 35 in communication with the compression chamber of cylinder 14. Valves 42 and 43 are closed. Clearance chamber 35 is partially filled with liquid to a height such that the effective volume provided in the compression chamber of the cylinder and in the clearance chamber is of the proper size so that the amount of gas drawn into and discharged from cylinder 14 at each stroke of the piston corresponds to the amount of residual gas delivered from the purification system at each stroke of the piston of cylinder 13 when normal pressures prevail throughout the apparatus. If for any reason the pressure in the purification system tends to increase, as for example where the temperature at which the gas is treated in the purification system decreases the amount of gas removed therein, this tendency may be overcome by opening valve 43 and pumping additional liquid from reservoir 38 into chamber 35 by means of the pump 40. The effective volume of the gas space in clearance chamber 35 in communication with the compression chamber of cylinder 14 is thereby decreased, the output of cylinder 14 at each stroke of the piston increased, and the tendency of the purification pressure to increase is thus counteracted by a more rapid withdrawal of gas from outlet 29 through line 30. On the other hand, if the pressure in the purification system tends to decrease, as for example, because of a rise in temperature which increases the loss of gas, valve 39 is opened, and liquid allowed to flow from chamber 35 to reservoir 38, thereby increasing the effective clearance volume communicating with the compression chamber of cylinder 14. The amount of gas discharged from cylinder 14 is decreased, and the tendency of the pressure in the purification system to fall is thus counteracted.

Chamber 35 should be so proportioned that, when it contains a minimum quantity of liquid and valve 37 is open, the discharge from cylinder 14 is decreased sufficiently to maintain the normal pressures in the purification system when a minimum amount of residual gas is discharged from the purification system under any operating conditions which may be encountered. The provision of a clearance device in which the effective volume of the clearance chamber may be varied by the introduction or withdrawl of a liquid, facilitates an exact regulation of the clearance of the compression chamber of cylinder 14 and the maintenance of predetermined pressures at successive points within the purification system or of a substantially constant pressure condition within the purification system considered as a unit irrespective of varying conditions within the purification system.

It is evident that the drawing illustrating one embodiment of the invention as described above is diagrammatic. For example, in the actual construction of an apparatus, valve 37 may be located in the head of compressor cylinder 14 in order to reduce clearance to a minimum when valve 37 is closed. It is also apparent, that numerous changes and modifications may be made in the specific organization described. Instead of a single five-stage compressor, it is possible to employ two separate compressors, each driven by constant speed motors, one compressor serving to subject the gas to the desired purification pressure in three stages, whence it is passed to the purification system, and the second compressor serving to compress the gas in two stages to the final synthesis pressure. Under such circumstances, the two compressors each operate at a constant speed, but the speed of operation of one compressor need not be the same as the speed of operation of the other. When operating with this arrangement, a substantially constant pressure in the purification system under varying operating conditions may be maintained by adjusting the clearance of the cylinder immediately following the purification system in the manner described in connection with the adjustment of the clearance of cylinder 14. In connection with the foregoing arrangement including the use of two compressors operated by separate constant speed motors, it is to be noted that in the appended claims, the expression "reciprocating the pistons each at a constant frequency" is intended to include situations in which the pistons of the individual compressors reciprocate at constant frequency, but where the speed of operation of the separate compressors may or may not be the same.

For simplicity, I have shown in the drawings a compressor having single-acting cylinders. Double-acting cylinders may, of course, be employed, in which case a clearance control device may be associated with each of the two compression chambers of the cylinder immediately following the purification system. It is also apparent that the number of stages of compression to which the gas is subjected may be more or less than five; for example, for some purposes it may be sufficient to compress the gas in a single stage prior to purification, or again it may be desired to employ but one compression stage following purification. The invention is applicable, however, in all cases where the gas is compressed in two or more stages, and is purified intermediate two of the stages of compression.

Further, when it is desired to employ two separate compressor means, one ahead of and the other beyond the purification system, it may in some instances be desirable to utilize a multi-stage turbo-compressor unit ahead of the purification train. Gas pressures at which purification may be effected according to the present invention may readily be obtained by the use of this type of compressor.

While I have described an apparatus in which the pressure within the purification system is maintained constant by changing the rate at which a gas is withdrawn from the purification system, it is possible to accomplish the same purpose by withdrawing the gas at a constant rate, and by varying the rate with which the crude gas is introduced to the purification system. For example, in the apparatus illustrated, clearance chamber 35 might be associated with cylinder 11 of the compressor, but this arrangement is less advantageous than that described where the clearance device is connected to the cylinder following purification, since the amount of crude gas handled by the compressor in a given period of time would be reduced when operating conditions tended to increase the purification pressure.

It is preferable to use the clearance device illustrated, but other devices such as those heretofore known in the art of compressing gases may be employed. For example, a cylinder head may be provided with two or more clearance chambers which communicate with the interior of the cylinder by way of valves, or a single clearance chamber may be employed, the effective volume of which is altered by means of a piston operable therein.

It will appear that one of the principal aims of the invention as thus far described is the maintenance of a substantially constant average pressure or pressure gradient in the purification system notwithstanding variable conditions arising therein over which an operator has no direct control. This maintenance of a substantially constant pressure is attained, as described, by suitable adjustment of the clearance control mechanism to vary the quantity of gas drawn through the purification system; that is, the pressure is maintained substantially constant, and the quantity of gas passed into and withdrawn from the purification system is a variable. The principles of the invention may also be employed, within certain limits, to cause a predetermined quantity of gas to pass through the purification system while simultaneously maintaining therein the optimum purification pressure. A further application of such principles of the invention will appear from a consideration of Fig. 2.

The numerals 45, 46, 47, 48, and 49 indicate the compressor units or cylinders of a five-stage compressor. The pistons of the several cylinders are driven from a crank shaft not shown. Crude gas is drawn into the low pressure cylinder 45 through the inlet pipe 50. The outlet sides of the cylinders 45 and 46 are connected to the inlets of cylinders 46 and 47 by the gas conduits 51. The discharge port of cylinder 47 is connected to the inlet of the purification system, indicated generally at 53, by the gas pipe 54. The outlet 55 of the purification system is in communication with the inlet side of the cylinder 48 through the conduit 56 including therein a control valve 57. After final compression in the cylinder 49, the gas is discharged through the outlet pipe 58 to apparatus not shown for ammonia synthesis, or for further purification or other treatment. The connections 51, 54, and 57 may include interstage coolers and means for withdrawing condensed water vapor therefrom similar to the apparatus described with reference to Fig. 1. Numeral 61 indicates diagrammatically a clearance control device which may be constructed and associated with the compression chamber of cylinder 48 in the same manner as already brought out in connection with Fig. 1 relative to the liquid cylinder 35 and compression cylinder 14. For the purpose of the present description, the compressor units, the purification system 53, the clearance control device 61, and the connecting piping and intercoolers may be designated as purification train A.

A second purification train B may be of substantially the same construction as purification train A, and may include an inlet pipe 62, a discharge conduit 63, the purification system 64, and the several compressor units, three stages arranged ahead, and two stages beyond the purification system. The outlet side of the third stage of compression is in communication with the purification system 64 through the conduit 65, and the outlet in the purification system is connected to the inlet side of the compression cylinder 66 through the pipe 67 having a control valve 68. A clearance control mechanism 69, similar to cylinder 35 and associated parts of Fig. 1, is connected to the compression chamber of the cylinder 66.

A third set of compressor units comprises in part the compression cylinders 70, 71 and 72 constructed and interconnected in the same manner as the compression stages located ahead of the purification trains A and B. The discharge port of the cylinder 72 is in communication with an inlet header 73. Inlet conduits 54 and 65 are each connected to the inlet header 73 through the by-pass conduits 75 and 76 controlled respectively by valves 77 and 78. The inlet header is provided with control valves 79 and 80. For the purpose of the present description, it may be considered that the valve 80 is closed at all times. It should be understood that the inlet header 73 may extend beyond the valve 80, and connect with other purification trains by gas conduits similar to connections 75 and 76.

An outlet header 82 is arranged near the outlets of the purification systems, and is connected to the purification system outlet conduits 56 and 67 through the by-pass conduits 83 and 84 including the control valves 85 and 86. One end of the header 82 is connected to the inlet side of the cylinder 88. Gas is discharged from the cylinder 89 through the outlet pipe 90.

The operation of the apparatus illustrated in Fig. 2 is as follows:

For the purpose of the discussion immediately following, it may be assumed that the valves 79, 85, and 86 are closed, and that the third compressor is out of service.

Crude gas is introduced into the purification train A through the inlet pipe 50. The gas passes successively through the compression cylinders 45, 46, and 47, and is pumped into the purification system 53 at the desired initial intermediate purification pressure through the conduit 54. After passing through the purification apparatus, the residual gas is discharged therefrom through the outlet 56, and passes the open valve 57 into and through the compression cylinders 48 and 49. The residual gas, at the required high pressure, is then discharged from the purification train through the outlet 58. In a similar manner, crude gas is drawn into the purification train B through the inlet pipe 62, and after compression and purification the residual gas leaves the train by way of the outlet conduit 63. The clearance control devices 61 and 69 are adjusted, as previously described, so as to secure and maintain the optimum purification pressure in the purification systems 53 and 64. The valves 77 and 78 are opened, thus placing the purification trains A and B in communication through the header 73.

When the valves 77 and 78 are opened, approximately equal quantities of gas pass through both systems, and the pressure in trains A and B is substantially the same. When the purification apparatus is operating at normal predetermined conditions, the gas under treatment passes through trains A and B in the manner already described in connection with Fig. 1.

If for some reason, conditions were to arise within either purification train which would not permit the particular train to operate at its usual efficiency, by suitable manipulation of the clearance controls 61 and 69, a portion of the gas may be diverted from the train operating at less than usual efficiency and by-passed through the train which is functioning properly. Suppose that some condition arises in purification system 53 so that the total quantity of gas which may be satisfactorily purified in train A in a unit of time is reduced about 5%. It will be apparent that if the operation of the apparatus as a whole were to be continued under these conditions, the normal quantity of gas would pass through train B, but the quantity of gas passing through train A would be reduced about 5%, and the quantity of gas discharged from trains A and B taken together would be reduced approximately 2½%. To overcome this difficulty, and to maintain the normal output of trains A and B considered as a unit, the clearance control mechanisms 61 and 69 may be adjusted in such manner that the gas, which cannot be handled in purification system 53, because of the abnormal conditions existing therein, may be by-passed through the purification train B, thus varying the relative quantities of gas passing through trains A and B. To effect this diversion of gas from the purification system 53 and to cause the same to pass through purification train 64, while at the same time maintaining the substantially constant normal optimum operating pressure in both trains, the clearance control 61 is adjusted so that the clearance in the compression chamber 48 is increased, and either simultaneously with or following the adjustment of clearance control 61, the size of the compression chamber in the cylinder 66 is decreased by adjustment of clearance control 69. It will appear, therefore, that the purification train B, under the conditions assumed, will be operating at approximately a 5% overload, but the quantity of gas passing through trains A and B taken together is the same as that leaving the apparatus when both purification systems were operating at their normal efficiency. In a like manner varying quantities of gas, within certain limits, may be by-passed through either purification train. It will be understood that the percentages noted in the description are mentioned by way of example only.

Under some conditions encountered in practice, it may be desirable to operate both purification trains at a small overload. For this purpose, the third set of compressor units may be cut into the system to handle the necessary extra quantity of gas. Valves 79, 85, and 86 are opened, and valves 77 and 78 remain open as before. Under this arrangement, gas from the low pressure stages of the three compressors will be split approximately evenly between the purification trains A and B. Where the division of the gas is not exactly as desired, the required split may be secured by a slight throttling of either valve 57 or 68. When an abnormally large quantity of gas is pumped through both purification systems, the result would be an increase in pressure in both purification trains if no adjustments in the apparatus were made. In order to operate the purification systems under a substantially constant predetermined pressure for which the apparatus is designed, it will be necessary to decrease the clearance on both cylinders 48 and 66. This decrease in clearance in the compression chambers increases the quantity of gas drawn through the purification trains, and offsets the tendency of the pressure in purification apparatus to increase on account of the larger volume of gas being treated. Because of the interconnection between the outlet conduits 56 and 67 with the outlet header 82, and the inclusion of the last two stages of the third compressor in the exit gas-line, the high pressure of the larger volume of residual gas may be obtained and regulated as desired.

All modifications of the apparatus, previously suggested as adapted for use with the single purification train described in connection with Fig. 1, may be applied to the apparatus of Fig. 2.

I claim:

1. Apparatus for compressing a gas in a plurality of stages and purifying the gas under pressure, comprising a plurality of purification systems during the normal operation of which substantially constant quantities of gas are treated therein, means including a plurality of compressor units for passing the gas under pressure through the purification systems, and means associated with the purification systems for varying the relative quantities of gas passing through the purification systems while maintaining substantially constant pressures therein.

2. Apparatus for compressing a gas in a plurality of stages and purifying the gas under pressure comprising a plurality of purification systems during the normal operation of which substantially equal quantities of gas are treated therein, means including a plurality of compressor units for passing the gas under pressure through the purification systems, and means including clearance control mechanism associated with the purification systems for varying the relative quantities of gas passing through the purification systems while maintaining substantially constant pressures therein.

3. Apparatus for compressing a gas in a plurality of stages and purifying the gas under pressure comprising a plurality of purification systems during the normal operation of which substantially equal quantities of gas are treated therein, means including a compressor unit ahead of and a compressor unit beyond the purification systems for passing the gas under pressure therethrough, and means including clearance control mechanism associated with compression mechanism beyond the purification systems for varying the relative quantities of gas passing through the purification systems while maintaining the pressures and the total quantity of gas treated therein substantially constant.

4. Apparatus for compressing a gas in a plurality of stages and purifying the gas under pressure comprising a plurality of gas purification systems connected in parallel, said purification systems being adapted during their normal operation to treat substantially constant quantities of gas, and means associated with each purification system cooperatively operable to vary the relative quantities of gas passing through the purification systems while maintaining substantially constant pressures therein.

5. Apparatus for compressing a gas in a plurality of stages and purifying the gas under pressure comprising a plurality of gas purification systems connected in parallel, said purification systems being adapted during their normal operation to treat substantially equal quantities of gas, and means including a clearance control mechanism associated with each purification system cooperatively operable to vary the relative quantities of gas passing through the purification systems while maintaining substantially constant pressures therein.

6. Apparatus for compressing a gas in a plurality of stages and purifying the gas under pressure comprising a plurality of gas purification systems connected in parallel, said purification systems being adapted during their normal operation to treat substantially equal quantities of gas, a compressor unit ahead of the purification systems and a compressor unit beyond each of the purification systems, and a clearance control mechanism associated with each compressor unit beyond the purification systems for varying the relative quantities of gas passing through the purification system while maintaining the pressures and the total quantity of gas treated therein substantially constant.

WALTER H. KNISKERN.